(12) United States Patent
Todhunter (10) Patent No.: US 9,031,947 B2
(45) Date of Patent: May 12, 2015

(54) SYSTEM AND METHOD FOR MODEL ELEMENT IDENTIFICATION

(75) Inventor: James Todhunter, Framingham, MA (US)

(73) Assignee: Invention Machine Corporation, Boston, MA (US)

( * ) Notice: Subject to any disclaimer, the term of this patent is extended or adjusted under 35 U.S.C. 154(b) by 468 days.

(21) Appl. No.: 11/691,597

(22) Filed: Mar. 27, 2007

(65) Prior Publication Data

US 2008/0243801 A1    Oct. 2, 2008

(51) Int. Cl.
*G06F 17/30* (2006.01)
*G06N 5/02* (2006.01)

(52) U.S. Cl.
CPC ............ *G06N 5/02* (2013.01); *G06F 17/30684* (2013.01)

(58) Field of Classification Search
USPC .......................................... 707/736, 758, 603
See application file for complete search history.

(56) References Cited

U.S. PATENT DOCUMENTS

| | | | |
|---|---|---|---|
| 5,331,556 A | 7/1994 | Black, Jr. et al. | |
| 5,418,889 A | 5/1995 | Ito | |
| 5,638,543 A | 6/1997 | Pedersen et al. | |
| 5,696,916 A | 12/1997 | Yamazaki et al. | |
| 5,708,825 A | 1/1998 | Sotomayor | |
| 5,748,973 A | 5/1998 | Palmer et al. | |
| 5,774,845 A | 6/1998 | Ando et al. | |
| 5,924,108 A | 7/1999 | Fein et al. | |
| 5,978,785 A | 11/1999 | Johnson et al. | |
| 5,978,820 A | 11/1999 | Mase et al. | |
| 6,026,388 A | 2/2000 | Llddy et al. | |
| 6,081,798 A | 6/2000 | Johnson et al. | |
| 6,128,634 A | 10/2000 | Golovchinsky et al. | |
| 6,138,122 A | 10/2000 | Smith et al. | |
| 6,167,370 A | 12/2000 | Tsourikov et al. | |
| 6,171,109 B1 * | 1/2001 | Ohsuga ........................ | 434/118 |
| 6,185,592 B1 | 2/2001 | Boguraev et al. | |
| 6,205,456 B1 | 3/2001 | Nakao | |
| 6,212,494 B1 | 4/2001 | Boguraev | |
| 6,246,911 B1 | 6/2001 | Seligman | |
| 6,246,977 B1 | 6/2001 | Messerly et al. | |
| 6,263,335 B1 | 7/2001 | Paik et al. | |
| 6,317,708 B1 | 11/2001 | Witbrock et al. | |
| 6,338,034 B1 | 1/2002 | Ishikawa et al. | |
| 6,349,316 B2 | 2/2002 | Fein et al. | |

(Continued)

FOREIGN PATENT DOCUMENTS

| | | |
|---|---|---|
| EP | 0940754 | 9/1999 |
| WO | 9740455 | 10/1997 |
| WO | 2005060684 | 7/2005 |

OTHER PUBLICATIONS

International Search Report dated Jul. 30, 2008 issued in corresponding International Application No. PCT/US2008/057183.

(Continued)

*Primary Examiner* — Son T Hoang
(74) *Attorney, Agent, or Firm* — Faegre Baker Daniels LLP (57) ABSTRACT

A problem analysis system and method, given at least one entity represented in an entity-relation-entity relationship, automatically formulates a query that is automatically submitted via a knowledge search tool to a database of mereological and functional relationships, and responses to this query from the database are automatically provided. The query can be formatted as a natural language query, a Boolean query, a key word query, or a query according to the query syntax of a database management system.

20 Claims, 7 Drawing Sheets

(56) References Cited

U.S. PATENT DOCUMENTS

| | | | |
|---|---|---|---|
| 6,374,209 | B1 | 4/2002 | Yoshimi et al. |
| 6,401,086 | B1 | 6/2002 | Bruckner |
| 6,424,362 | B1 | 7/2002 | Bornstein et al. |
| 6,442,566 | B1 * | 8/2002 | Atman et al. ............. 707/103 R |
| 6,537,325 | B1 | 3/2003 | Nishizawa |
| 6,711,585 | B1 | 3/2004 | Copperman et al. |
| 6,754,654 | B1 | 6/2004 | Shah et al. |
| 6,789,230 | B2 | 9/2004 | Katariya et al. |
| 6,792,418 | B1 | 9/2004 | Binnig et al. |
| 6,823,325 | B1 | 11/2004 | Davies et al. |
| 6,823,331 | B1 | 11/2004 | Abu-Hakima |
| 6,871,199 | B1 | 3/2005 | Binnig et al. |
| 7,035,877 | B2 | 4/2006 | Markham et al. |
| 7,065,514 | B2 | 6/2006 | Yang-Stephens et al. |
| 7,120,574 | B2 | 10/2006 | Troyanova et al. |
| 7,251,781 | B2 | 7/2007 | Batchilo et al. |
| 7,295,958 | B1 * | 11/2007 | Suh et al. ........................... 703/7 |
| 7,539,656 | B2 | 5/2009 | Fratkina et al. |
| 2001/0037328 | A1 | 11/2001 | Pustejovsky et al. |
| 2001/0049688 | A1 * | 12/2001 | Fratkina et al. ............ 707/104.1 |
| 2002/0010574 | A1 | 1/2002 | Tsourikov et al. |
| 2002/0010909 | A1 * | 1/2002 | Charisius et al. ................. 717/2 |
| 2002/0055974 | A1 | 5/2002 | Hawkes et al. |
| 2002/0059069 | A1 | 5/2002 | Hsu et al. |
| 2002/0111784 | A1 * | 8/2002 | Keller et al. .................... 703/14 |
| 2002/0111811 | A1 | 8/2002 | Bares et al. |
| 2002/0120651 | A1 | 8/2002 | Pustejovsky et al. |
| 2002/0138529 | A1 | 9/2002 | Yang-Stephens et al. |
| 2003/0004936 | A1 | 1/2003 | Grune et al. |
| 2003/0061211 | A1 | 3/2003 | Shultz et al. |
| 2004/0220893 | A1 | 11/2004 | Spivack et al. |
| 2004/0268283 | A1 * | 12/2004 | Perry et al. ...................... 716/11 |
| 2005/0015217 | A1 * | 1/2005 | Weidl et al. .................... 702/185 |
| 2005/0033711 | A1 | 2/2005 | Horvitz et al. |
| 2005/0044064 | A1 | 2/2005 | Haase |
| 2005/0055385 | A1 * | 3/2005 | Sinha et al. ................... 707/203 |
| 2005/0114282 | A1 * | 5/2005 | Todhunter ....................... 706/50 |
| 2006/0142907 | A1 * | 6/2006 | Cancilla et al. ................. 701/29 |
| 2006/0167931 | A1 * | 7/2006 | Bobick et al. ................. 707/102 |
| 2006/0178862 | A1 * | 8/2006 | Chan et al. ...................... 703/11 |
| 2006/0242195 | A1 * | 10/2006 | Bove et al. ................ 707/103 R |
| 2007/0006177 | A1 * | 1/2007 | Aiber et al. ................... 717/136 |
| 2007/0050393 | A1 * | 3/2007 | Vogel et al. ................... 707/102 |

OTHER PUBLICATIONS

Kupiec, Julian, et al., "A Trainable Document Summarizer," pp. 1-6.
Invention Machine, "Techoptimizer User Guide", vol. 4, Chapter 2, pp. 1-61.
Goldstein, Jade, et al., "Summarizing Text Documents: Sentence Selection and Evaluation Metrics", Proceedings of the 22nd Annual International ACM SIGIR Conference on Research and Development in Information Retrieval, pp. 121-128, NY, USA, 1999. ACM Press.
Supplemental European Search Report dated Nov. 16, 2010 issued in corresponding European Application No. 04812213.9.
Chang, et al, "Boolean Query Mapping Across Heterogeneous Information Sources," IEEE Transactions on Knowledge and Data Engineering, Aug. 1996, pp. 515-521, vol. 8, No. 4.
Florescu, et al., "Query Reformulation in Multidatabase Systems using Semantic Knowledge," INRIA Research Report, May 31, 1995, Rocquencourt, France.
Argamon-Engelson, Shlomo, et al., A Memory-Based Approach to Learning Shallow Natural Language Patterns, Department of Mathematics and Computer Science, May 23, 1999, Bar-Ilan University, Ramat Gan, Israel.
Tseng, et al., "Applying case-based reasoning for product configuration in mass customization environments," Expert Systems with Applications, Oxford, GB, vol. 29, No. 4, Nov. 1, 2005, pp. 913-925.
Extended European Search Report dated May 30, 2011 issued in corresponding European Application No. EP08744300.8.

* cited by examiner

SYSTEM AND METHOD FOR MODEL ELEMENT IDENTIFICATION

RELATED APPLICATIONS

The present application, while not claiming priority to, may be related to the following United States patent applications: U.S. patent application Ser. No. 11/686,660, filed Mar. 15, 2007, titled "Semantic Processor For Recognition Of Whole-Part Relations In Natural Language Documents," which is a continuation-in-part application of U.S. patent application Ser. No. 10/208,941, filed Jul. 31, 2002, titled "Computer Based Summarization of Natural Language Documents," (published as U.S. Patent Application Pub. No. 20030130837 on Jul. 10, 2003), which claims priority to U.S. Provisional Application Ser. No. 60/308,886, titled "Computer Based Summarization of Natural Language Documents, filed Jul. 31, 2001.

The present application, while not claiming priority to, may be related to the following United States patent applications: U.S. patent application Ser. No. 10/737,147, filed Dec. 15, 2003 (U.S. Patent Application Pub. No. 20050131874, published Jun. 16, 2005) and U.S. patent application Ser. No. 10/723,633, filed Nov. 26, 2003 (U.S. Patent Application Pub. No. 20050114282, published May 26, 2005). These applications are incorporated herein by reference in their entirety.

FIELD OF INTEREST

This application relates to systems and methods of automatic knowledge search for access to information stored in computer-based database systems. More specifically, the present application relates to knowledge searches based on accessing information contained in databases of whole-part (i.e., "mereological") relationships and related functional relationships.

BACKGROUND

The process of innovation within organizations remains largely untouched by the general trend toward improved efficiency through automation. The traditional model of stimulating innovative thought is through the application of psychological techniques, such as brainstorming. These techniques bring limited improvement to the process.

More recently, there have emerged a number of computer-based technologies that can be applied by a researcher or designer that is considering the creation or improvement of a device, process, or other system. These technologies can be referred to as "problem analysis tools."

Problem analysis tools assist the user by enabling the user to consider a complex system and identify discrete problems which should be addressed. These tools accomplish this by providing computer-based interfaces which assist in the application of well understood methods of problem analysis including, but are not limited to, root cause analysis, TRIZ (a Russian acronym for "Teoriya Resheniya Izobretatelskikh Zadatch"), value engineering, system functional analysis, and system benchmarking. TRIZ is a methodology, tool set, knowledge base, and model-based technology for generating innovative ideas and solutions for problem solving. An example of such a tool, called TechOptimizer™, is a computer system marketed by Invention Machine Corporation of Boston, Mass. The technology used in TechOptimizer™ to assist in problem analysis is partially described in U.S. Pat. No. 6,056,428 and U.S. Pat. No. 6,202,043. The system disclosed in these two patents is fully described in TechOptimizer™ user guide, version 4.0, Invention Machine Corporation, Boston, Mass.

The TechOptimizer™ software suite includes a module, which allows a user to build a system functional model of a design and/or technological process, to perform value diagnostics of the design and/or technological process, identify a better (for example, higher value) configuration of the design and/or technological process, and identify what problem has to be solved in order to implement this new configuration.

A key deficiency with problem analysis tools is that while they greatly aid in the identification of specific issues to be addressed, the user of such tools is required to possess the knowledge about the problem being considered to adequately describe the problem or system in which the problem exists. In U.S. patent application Ser. No. 11/273,137, "System and Method for Problem Analysis," filed Nov. 14, 2005, there is disclosed a method for providing user specific relevant information to assist in the modeling of problems, wherein the principle aspect of analysis is cause-effect relationships, and wherein a cause or effect statement is automatically reformulated as a natural language query. The query is submitted to a database, and the results of the query are returned, thereby greatly facilitating the process of identifying related cause-effect data.

However, there exists a class of situations in the use of problem analysis tools which make the use of these tools difficult and do not yield to the technique above. In these situations a researcher or designer must consider the nature of the system being examined. Whether the system being examined comprises a device, a process, an organization, or any other type of natural or artificial system, the researcher or designer must understand the make-up of the system, its constituent components, and the interactions among those components. This understanding helps lead the researcher to a deeper understanding of the problem and subsequently to solution concepts.

This can be easily understood by considering the process of the method of system analysis commonly referred to as "system functional modeling." In this analytical process, the researcher can begin with a statement of a system under investigation, for example "milking stool." The researcher will then consider what the components of the milking stool system are: stool legs, seat, handle, farmer, cow, floor, milk pail. The researcher will then consider for each pair of components of the system, what the functional interactions between the components are. For example, it may be identified that an interaction between the seat and the farmer is that the seat supports the farmer. The researcher will continue with iterative analysis until all known interactions have been identified and classified. Well understood principles of value engineering analysis may then be used to gain insights into the relative value contribution of each component to the overall system. This type of analysis is very effective and in wide use. However, it is also difficult because the researcher has no well defined methods for identifying the components of the system and their functional interactions. As a result, the method is largely dependant on personal domain knowledge.

A similar problem can be seen in the analytic method commonly referred to as "systems thinking." In this method, practitioners identify parts of process system and explore the dynamic nature of the system, identifying interactions between elements, and looking for causal cycles. Just as with the case of the researcher performing a system functional modeling analysis, the systems thinking researcher is left to rely on personal domain knowledge to identify the components and interactions of any particular system.

In both of these situations, the user must construct a system model, and use his or her domain knowledge to identify components of the system and the interactions between those components. If the user does not have adequate domain knowledge, the user must conduct independent research using whatever means are available to find useful information. These means could include using books, public Internet search engines, private data subscription services, internal enterprise portals, or other sources of relevant technical information.

SUMMARY

In accordance with one aspect of the invention, provided is a problem analysis method for identifying elements of a system. The method comprises providing a system element store comprising machine readable representations of system models comprising system elements; extracting system elements from at least one system model and automatically formulating a query from the system elements; using the query, searching one or more knowledge bases for component elements useful to form the system elements; and at least one of storing and displaying the component elements in association with the system elements used to form the query.

The method can further comprise, prior to formulating the query, classifying the system elements as: a whole element of a whole-part relationship, an entity element of an entity-relation-entity relationship, a pair of entity elements of an entity-relation-entity relationship, or a relation element of an entity-relation-entity relationship.

Searching the one or more knowledge bases can comprise submitting the query to a knowledge search engine and formatting the query to be compatible with the knowledge search engine.

Formatting the query can include formatting the query as either a natural language query, a Boolean query, a key word query, or a query according to the query syntax of a database management system.

The knowledge search engine can comprise a semantic indexing and search tool and the one or more knowledge bases comprising a semantic analysis knowledge base.

The system models can include device functional models and the component elements can include one or more device component elements.

The system models can include process functional models and the component elements can include one or more process component elements.

The one or more knowledge bases can comprise one or more knowledge bases selected from a group consisting of: one or more locally accessible knowledge bases; one or more knowledge bases containing corporate knowledge; and one or more publicly accessible knowledge bases.

The method can further comprise representing a system element graphically linked to one or more other system elements.

The method according to claim 1, wherein the one or more knowledge bases comprise one or more mereology and functional relationship databases.

In accordance with another aspect of the invention, provided is a computer program product that comprises computer-executable instructions stored in at least one storage device and executable by at least one processor to perform a problem analysis method for identifying elements of a system. The method comprises providing a system element store comprising machine readable representations of system models comprising system elements; extracting system elements from at least one system model and automatically formulating a query by transforming the system elements; using the query, searching one or more knowledge bases for component elements useful to form the system elements; and at least one of storing and displaying the component elements in association with the system elements used to form the query.

The method can further comprise, prior to formulating the query, classifying the system elements as: a whole element of a whole-part relationship, an entity element of an entity-relation-entity relationship, a pair of entity elements of an entity-relation-entity relationship, or a relation element of an entity-relation-entity relationship.

The one or more knowledge bases can comprise one or more mereology and functional relationship databases.

In accordance with another aspect of the invention, provided is a problem analysis system for system modeling. The system comprises: an element store comprising machine readable representations of system models comprising system elements; a query formulator configured to extract system elements from at least one system model and to automatically formulate a query from the system elements; a knowledge search engine configured to receive the query and search one or more knowledge bases for component elements useful to form the system elements.

The query formulator can be further configured, prior to formulating the query, to classify the system elements as: a whole element of a whole-part relationship, an entity element of an entity-relation-entity relationship, a pair of entity elements of an entity-relation-entity relationship, or a relation element of an entity-relation-entity relationship.

The query formulator can be configured to format the query to be compatible with the knowledge search engine.

The query formulator can be configured to format the query as either a natural language query, a Boolean query, a key word query, or a query according to the query syntax of a database management system.

The knowledge search engine can comprise a semantic indexing and search tool and the one or more knowledge bases can comprise one or more semantic analysis knowledge base.

The system can further comprise one or more functional modeling tools.

The one or more functional modeling tools can include a device functional modeling tool and the component elements can include at least one device component element.

The one or more functional modeling tools can include a process functional modeling tool and the component elements can include at least one process component element.

The one or more knowledge bases can comprise one or more databases selected from a group consisting of: one or more locally accessible databases; one or more knowledge bases containing corporate knowledge; and one or more publicly accessible databases.

The system can further comprise a computer program stored in a computer-readable storage medium for execution by a computer system. The computer system can comprise: one or more computer processing elements; one or more display devices; one or more user input devices; and communication elements for communicating with the one or more knowledge bases.

The system can be configured to generate user-interactive screens on the one or more display devices configured to represent a system element graphically linked to one or more other system elements.

The one or more knowledge bases can comprise one or more mereology and functional relationship databases.

DETAILED DESCRIPTION

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Figure 5:
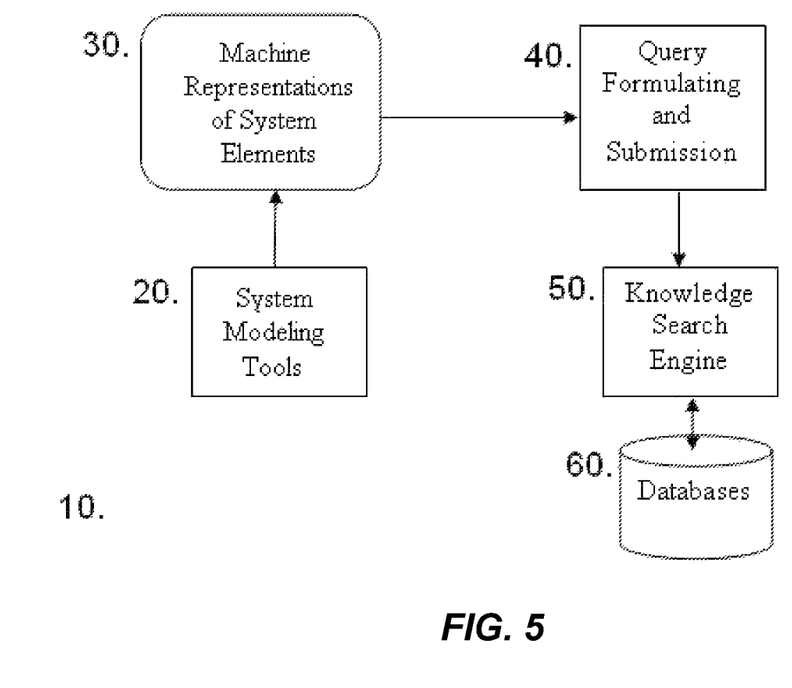
FIG. 5 is a high-level architecture diagram of an embodiment of a problem analysis system, in accordance with aspects of the present invention.

FIG. 5 shows a high-level architecture for a problem analysis system according to an embodiment of the present invention. The system 10 depicted in FIG. 5 comprises: System Modeling Tools 20, i.e., tools for system modeling such as the one depicted in FIG. 1 described in additional detail below; a System Element Store 30, which comprises machine representations of system models containing system elements; a Query Formulator 40, which performs query formulation and submission; a Knowledge Search Engine 50 that comprises selected one or more knowledge search engines; and searchable knowledge data bases 60, such as Mereological and Functional Relationship Databases.

The System Modeling Tools 20 provide functionality for modeling specific systems, resulting in machine readable representations of one or more system models corresponding to the system or systems being modeled, each system model comprising system elements. The System Element Store 30 contains the machine readable system model representations that can be further processed in accordance with embodiments of the present invention. The Query Formulator 40 extracts specific system elements from the models in the System Element Store 30 and transforms the system elements into queries for use by the Knowledge Search Engine 50 in extracting information from the Mereological and Functional Relationship Databases 60. These queries search for component elements in Mereological and Functional Relationship Databases 60 useful to form the system elements, e.g., component elements that can satisfy the requirements of the system elements.

Figure 6:
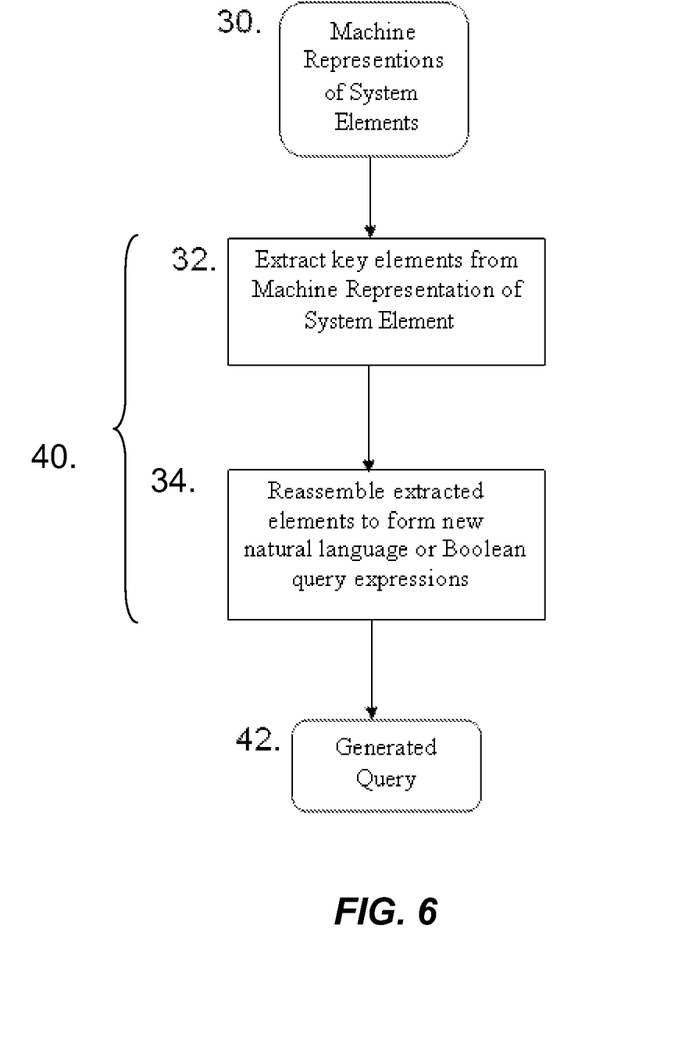
FIG. 6 is a flow diagram of a problem analysis system, in accordance with aspects of the present invention.

FIG. 6 shows a flow diagram that more specifically illustrates processing steps according to an embodiment of the present invention. The System Element Store 30 contains system models that contain one or more system elements. Each system element can include one or more components, e.g., parts, that performs one or more functions, within the context of the system model, and can have certain known relationships to other system elements. All of this can be stored in System Element Store 30.

Figure 1:
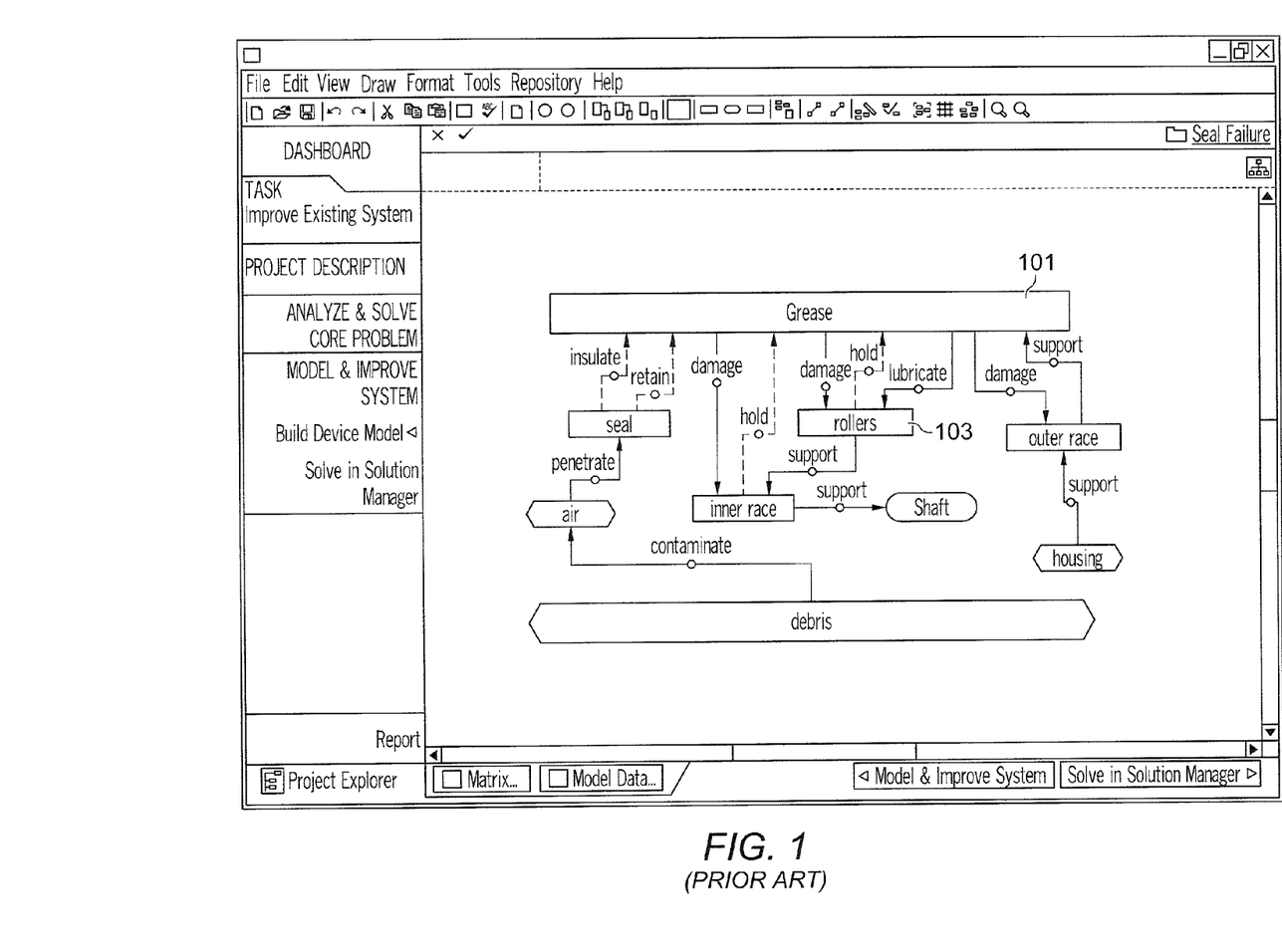
FIG. 1 shows an embodiment of a user interface for analyzing engineering systems using device functional modeling, in accordance with the prior art.

Query Formulator 40 can include an Element Extractor 32 configured to identify specific system elements from the System Element Store 30 required to accomplish a set of system objectives. The Element Extractor 32 processes the system elements to extract key component elements. Element Extractor 32 can extract a name of a component element or the name of a function performed by a component element associated with at least one system element. The component elements can form a part of an entity-relation-entity relationship represented in the system model. An example of an entity-relation-entity relationship would be inner race-support-shaft, as shown in FIG. 1. While the disclosures of FIG. 5 and FIG. 6 were not previously known, FIG. 1 shows an embodiment of a user interface for analyzing engineering systems using device functional modeling, in accordance with the prior art.

The Query Formulator 40 can also include a Query Assembler 34 configured to assemble the key system elements to generate a query 42. Generating the query can include formatting the query as either a natural language query, a Boolean query, a key word query, or a query according to the query syntax of a database management system, in this embodiment. The query is then submitted to the Knowledge Search Engine 50 (as shown in FIG. 5), which implements searching of a database 60 (such as a semantically indexed database) for information relevant to the query. Responses to the query may be automatically provided to a user in a graphical or text format.

Embodiments of the present invention enhance the use of various problem system modeling tools by providing the ability to analyze and process system elements related to systems to be analyzed, as an improvement above and beyond prior problem analysis tools or systems. This improvement in problem analysis is provided, for example, by the ability to access knowledge bases outside of a user's local knowledge domain. Such embodiments can include one or more of Device Functional Modeling tools and Process Functional Modeling tools configured to generating system models.

As indicated above with respect to FIG. 5, a Knowledge Search Engine 50 is used to extract information from databases 60. The Knowledge Search Engine 50 comprises one or more knowledge search tools (also commonly referred to as database query tools) that facilitate the efficient access to information stored in computer-based database systems, such as those represented by databases 60. When applicable, a knowledge search tool and a database to be searched by it are collectively referred to herein as a knowledge base. A user is able to locate relevant information by presenting a properly constructed query in an appropriate form (e.g. natural language or Boolean expression) to the knowledge search tool which searches the database and obtains results. The knowledge search tool responds to the entered query by constructing a result set comprising a list of information that meets the relevancy criteria imposed by the knowledge search tool.

An example of such a knowledge search tool is a computer-based system called Goldfire Intelligence™ marketed by Invention Machine Corporation, Boston, Mass. The technology used in this tool is partially described in U.S. Pat. No. 6,167,370, the content of which is incorporated herein by reference. An embodiment of the present invention uses the semantic indexing and search technology described in U.S. Pat. No. 6,167,370 for the purpose of performing knowledge searches. It will be apparent to the skilled practitioner that any other knowledge search tool could be used in an alternative embodiment.

As indicated above, the Query Formulator 40 provides queries to the Knowledge Search Engine 50 for the extraction of information from databases 60. In one embodiment, the machine representation of a system element is used as the source of key elements used to build a query. The type of actions taken by the Query Formulator 40 can be shown by example with reference to the problem analysis tools depicted in FIGS. 1 and 2.

FIG. 1 illustrates the use of device functional modeling for system modeling. FIG. 1 shows a screen from the Goldfire Innovator™ program described above. In FIG. 1, a functional model for a device known as a roller bearing is shown. The box 101, labeled "Grease," which is connected by an arrow labeled "lubricate" to the box 103 labeled "rollers," represents a component element of the system element which performs a function of "lubricate" affecting the component element "roller."

Figure 2:
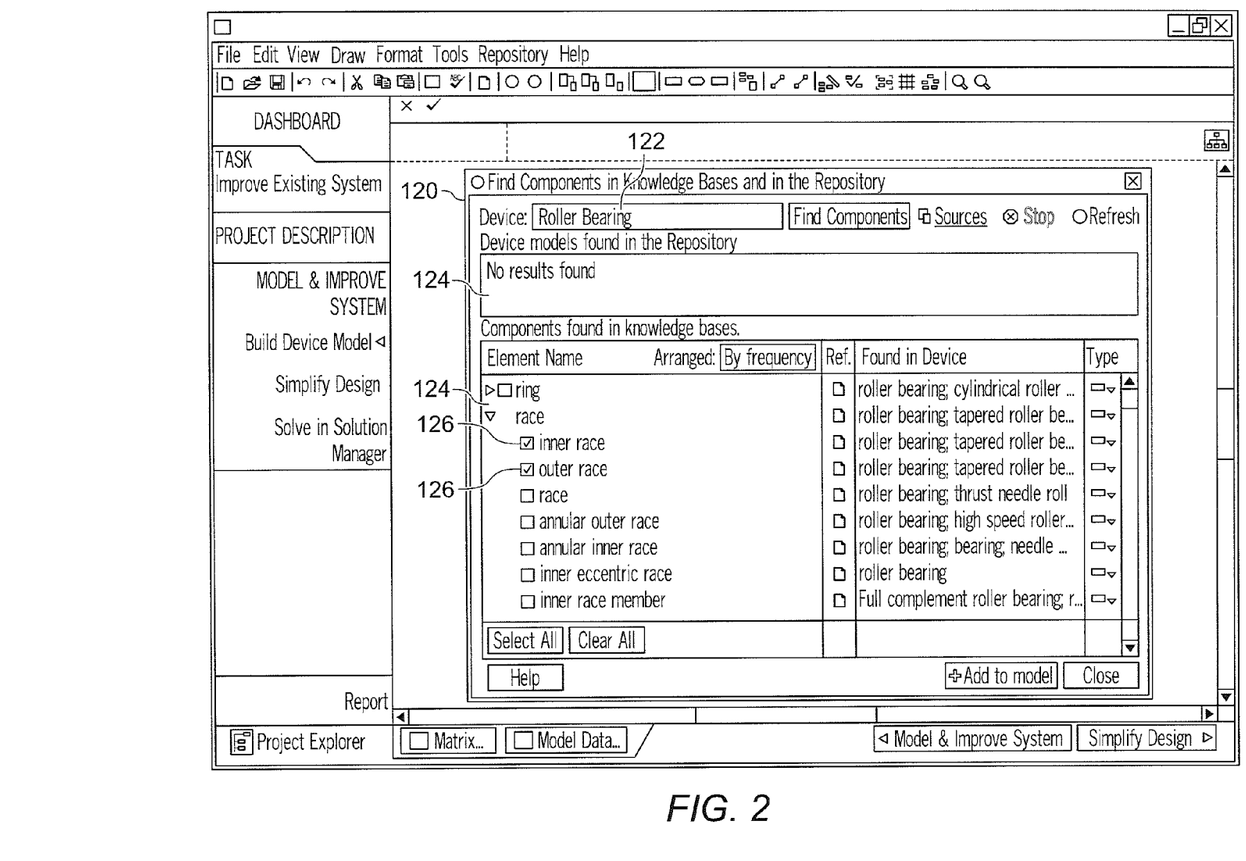
FIG. 2 shows an embodiment of a user interface used for system modeling using device functional modeling, in accordance with aspects of the present invention.
Figure 4:
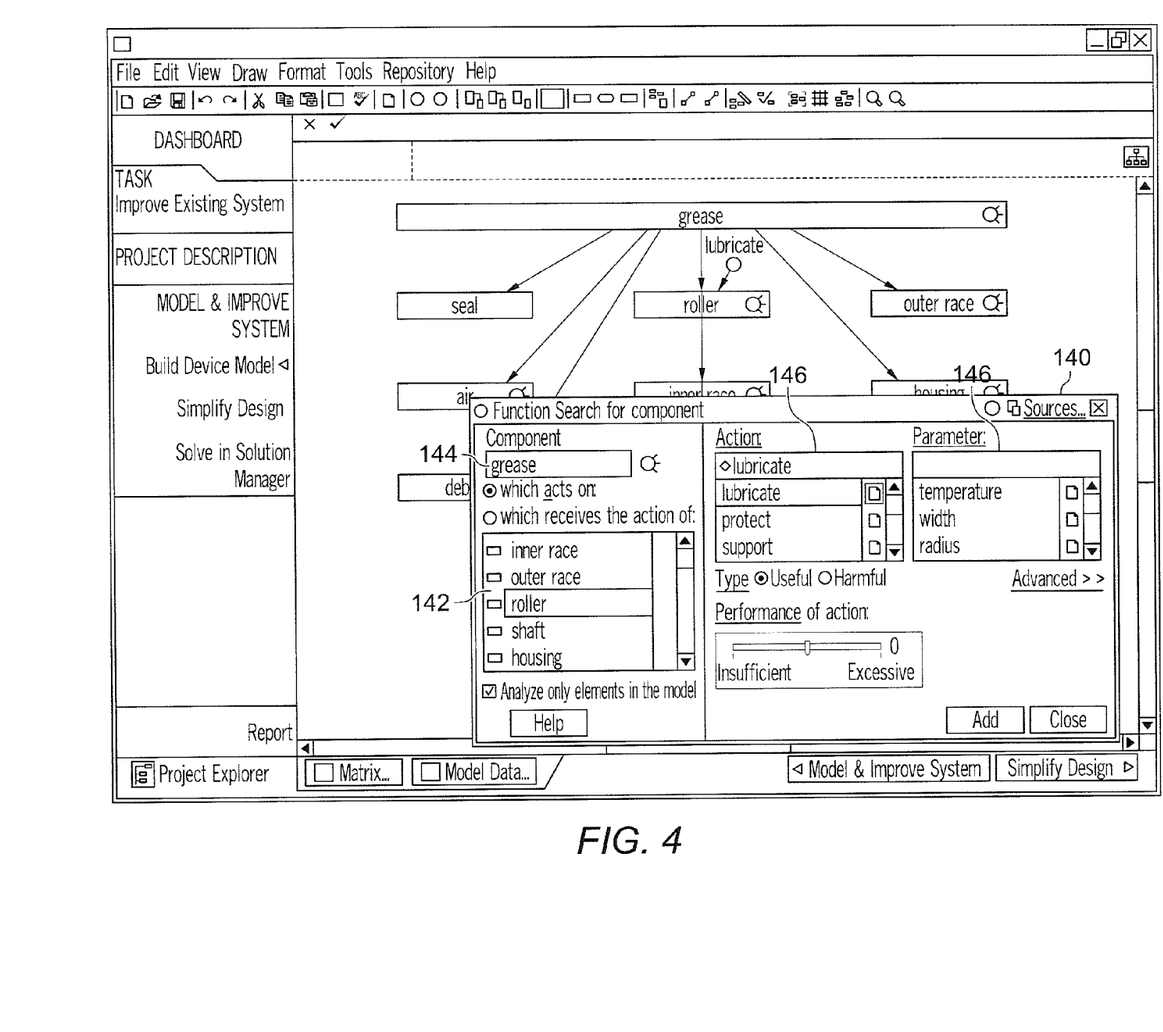
FIG. 4 shows an embodiment of a user interface that can be in device functional modeling of a system, in accordance with aspects of the present invention.

FIGS. 2, 4, and 5 show how the identification and construction of the system elements for this device functional model may be aided by an embodiment of the present invention. In FIG. 2, a Parts Finder window 120 provides proposed component elements which represent possible parts of a whole system "Roller Bearing," as a system element of a system model. Based on the interpretation of the system element identification "Roller Bearing", the Query Formulator 40 constructs the query "Roller Bearing" to be submitted to the knowledge search tool of Knowledge Search Engine 60. The query is formed by automatic reformulation by translating the system element into a natural language query, a key word query, or a query according to the query syntax of a database management system. The query is shown, as a natural language query, in the Device text box portion 122 of the Parts Finder window 120 as "Roller Bearing." The window also allows configuration by a user to, for example, rewrite the Query, and to limit the search.

FIG. 2 also shows the results from querying the Knowledge Bases with the natural language query "Roller Bearing," which take the form of problem analysis results. Relevant possible results based on the query are obtained from the knowledge bases and listed in the sub-panels 124 below the query.

Various types of knowledge bases may be accessed in response to a query and these knowledge bases may be resident in various places. For example, these knowledge bases cab be resident in one or more of three possible places. One set of knowledge bases can be contained in the user's own computer memory, or portable memory devices such as CDs that can accessed at the user's location. Another set of knowledge bases can be can be Corporate Knowledge, which is typically on one or more servers resident or privately accessible to user's within the organization, such as a corporation. Another set of knowledge bases can be publicly accessible search engines and databases, such as, for example, Google™ (a search engine), the U.S. Patent and Trademark Office patent collection (a searchable database).

FIG. 2 shows examples of two types of knowledge bases that may be accessed to assist a user in the analysis of a problem. The sub-panels 124 show "Components found in knowledge bases" and "Device models found in the repository." General document repositories that have been semantically indexed provide the "Components found in knowledge bases." "Device models found in the repository" are provided from repository models that contain stored models of prior system modeling analysis performed by users. Hence, embodiments of the present invention allow for system modeling to be supported by more general knowledge represented by general document repositories and by more specific knowledge that leverages past analysis that is captured in the repository models.

Figure 3:
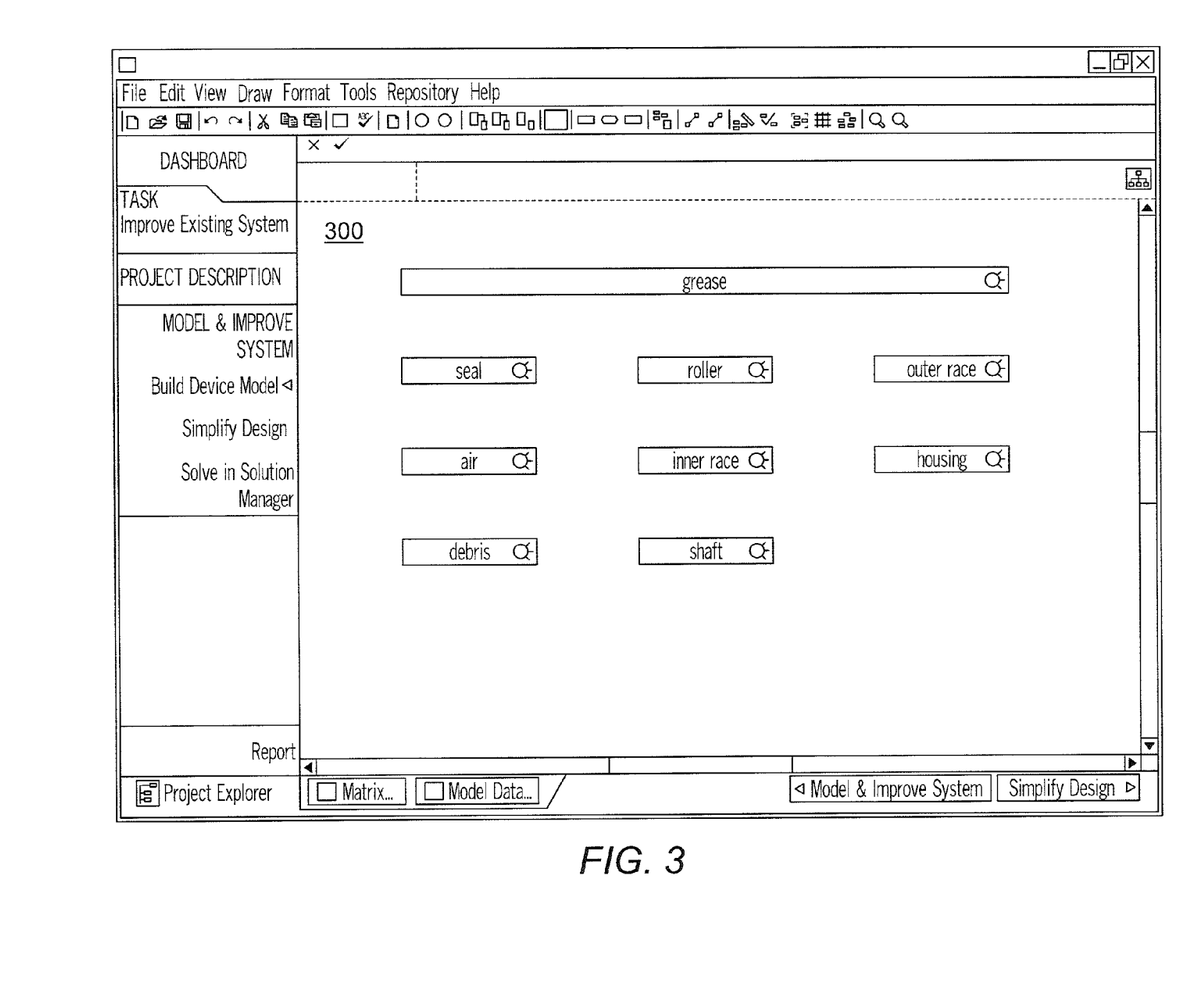
FIG. 3 shows an embodiment of another user interface used for system modeling using device functional modeling, in accordance with aspects of the present invention.

Also, as is shown in FIG. 2, the user can select which of the suggested component elements to include in the system model by activating selection indicators 126. The selection results in the selected component elements being placed on the system model canvass as shown in FIG. 3. For example, the component elements inner race and outer race are selected in the "Components found in knowledge bases" pane and appear in the system model canvas 300 of FIG. 3.

In FIG. 4, the Function Search window 140 provides proposed relationship elements representing possible functional interaction between system component elements. In FIG. 4, a sub-panel 142 provides proposed component elements which represent elements of the system that the component being examined, in this case "grease", is known to act upon. Based on the interpretation of the selected component "grease", the system constructs the query "grease" as a query to be submitted to a knowledge search tool by automatic reformulation by translating the system element into a natural language query. The query is shown in the Component text box portion 144 of the Function Search window 140. The sub-panels 146 provide the list of known interactions and the effects of those interactions for a given pair of component elements, "grease" and "roller". Based on the interpretation of the selected components "grease" and "roller", the system constructs the query "grease and roller" as a query to be submitted to a knowledge search tool by automatic reformulation by translating the system element into a natural language query.

FIG. 4 also shows the results from querying the Knowledge Bases with the natural language query "grease". This search may be triggered by clicking on an icon to select a specific system element and requesting assistance to identify possible interactions with other system elements by clicking on an icon. The software also allows configuration by a user to, for example, rewrite the Query, and to limit the search. FIG. 4 shows the completed search with relevant possible system element results from the knowledge bases listed in sub-panel 142 below the query.

FIG. 4 further shows the results from querying the Knowledge Bases 60 with the natural language query "grease and roller". This search may be triggered by clicking on the component name "roller" in sub-panel 142 to select the system element "roller" and requesting assistance to identify possible interactions with the system component "grease". FIG. 4 shows the completed search with relevant possible interaction results from the knowledge bases listed in sub-panels 146. A user can then further elect to capture the specific interactions in the functional model of the system.

It will be apparent to the skilled practitioner that in alternative embodiments the specific mechanism for extraction of key query elements from a given system modeling tool's machine representation will vary with the tool as will the mechanism for construction of the automatically formed query. For example, FIG. 4 depicts a graphical representation corresponding to the results of using a system modeling tool that automates the process of device functional modeling. In this situation, the result of the device functional modeling has a machine representation which is a directed graph, wherein each node of the graph represents a component element and each edge (shown as arrows connecting the nodes) of the graph represents a functional interaction between the nodes (i.e., component elements) connected by the edge. The combination of two nodes and a connecting edge is also referred to as an "entity-function-entity relationship."

In this case, the machine representation of each system element includes a well formed natural language fragment. Thus, if the user wishes to understand possible functional relationships of the components "grease" and "roller", since the user has the presumed goal of identifying functional elements of the system by selecting the nodes "grease" and "roller," the user tasks the program to create the formulation of the query in which the nodes are translated into the query statement. The system does this by extracting the key component data and generating a query of the form "grease and roller," where "grease" is a component element of the system acting upon the component element "roller".

Embodiments of the present invention can be applied in the context of Device Functional Modeling, such as that illustrated in FIG. 1. As briefly discussed above, Device Functional Modeling can be used when a user is presented with a system for which related system elements are to be identified. It will be apparent to the skilled practitioner that the methods illustrated for Device Functional Modeling are equally applicable to an embodiment of the present invention in the context of Process Functional Modeling. In the Process Functional Modeling context, system modeling comprises determining potential operations (as component elements) which comprise a process and the interactions (i.e., relationship elements) between those operations. Hence, in both the contexts of Device Functional Modeling and Process Function Modeling, being instances of different approaches to system modeling, embodiments of the present invention support analysis for determination of system elements comprising component elements and relationship elements. Those skilled in the art will understand that embodiments of the present invention may also be applied to other modeling techniques, and is not limited to Device Functional Modeling and Process Functional Modeling.

Figure 7:
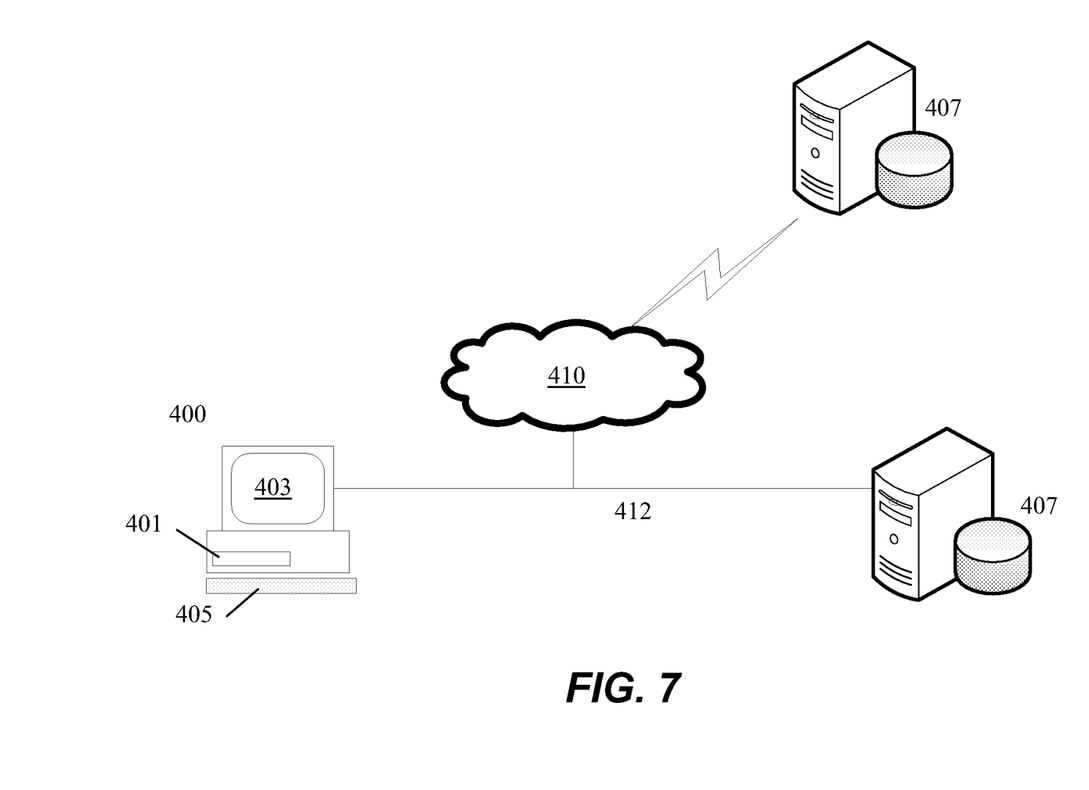
FIG. 7 shows an architecture diagram for an embodiment of a hardware implementation used for problem analysis, in accordance with aspects of the present invention.

Embodiments of the present invention may be implemented in typical computer systems, such as the system 400 shown in FIG. 7. Computer system 400 comprises at least one processing element 401, a display 403, an input device 405, and a link to databases 407 that provide the necessary information to provide responses to queries. Databases 407 may be accessible via a remote network 410, e.g., a wide area network or the Internet, a local network 412, e.g., an enterprise or local area network, or a combination thereof.

The functionality of the computer system 400 can take the form of computer instructions or program code executable by one or more computers, microprocessors, microcontrollers, or other processing devices, such as processing element 401. The computer-executable instructions for implementing the system functionality can be resident in memory on the processing device 401, or may be provided to the processing devices by floppy disks, hard disks, compact disk (CDs), digital versatile disks (DVDs), read only memory (ROM), server, or any other storage medium.

Since it is the case that relevant knowledge needed to model the systems identified through the use of a system modeling tool often exist in the body of knowledge accessible via a knowledge search tool, this addition of these two new elements to the system modeling tools present immediate and compelling benefits to the user. A new model of use is enabled wherein the operations of system modeling and applied research are no longer disjoint activities. Now, a single operation is made available which allows users to dynamically find potentially relevant information outside the domain of knowledge of the user and required for a thorough analysis of modeled systems as they are identified. This results in greater productivity and accuracy of modeling as the tradition latency between system element identification and related mereological or functional relationship generation is eliminated, as is the dependency on the scope of the user domain knowledge.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom.

This disclosure has been made with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . . "

It is, therefore, understood that various modifications may be made and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A method for identifying elements of a system, the method implemented by at least one computer processor coupled to at least one data storage device and comprising:
providing a system element store comprising machine-readable representations of system models comprising system elements classified as a whole element of a whole-part relationship, an entity element of an entity-relation-entity relationship, a pair of entity elements of an entity-relation-entity relationship, or a relation element of an entity-relation-entity relationship;

electronically receiving a graphical user interface input identifying a system model as a selected electronic representation of the system;

in response to the graphical user interface input,
extracting corresponding system elements of the identified system model from the system element store, and automatically formulating a query from the extracted system elements, wherein the extracted system elements represent a set of system objectives;

searching one or more mereological and functional relationship databases using a knowledge search engine, the one or more merelogical and functional relationship databases including one or more general document repositories that are semantically indexed and contain non-hierarchical database structures and additional one or more knowledge bases selected from the group consisting of: one or more locally accessible knowledge bases, one or more knowledge bases containing corporate knowledge, and one or more publicly accessible knowledge bases;

using the query to retrieve component elements useful to form the extracted system elements and identify functional interactions between the component elements, wherein the component elements represent parts of entity-relationship-entity relationships represented in the identified system model; and storing and displaying the retrieved component elements and identified functional interactions as search results in association with the extracted system elements, wherein the search results are represented as user-selectable options indicating design alternatives to satisfy the set of system objectives of the system.

2. The method according to claim 1, wherein the system elements of the system element store are classified prior to formulating the query.

3. The method according to claim 1, wherein searching the one or more mereological and functional relationship databases further comprises formatting the query to be compatible with the knowledge search engine.

4. The method according to claim 3, wherein formatting the query includes representing the query as either a natural language query, a Boolean query, a keyword query, or a query according to a query syntax of a particular database management system.

5. The method according to claim 3, wherein the knowledge search engine comprises a semantic indexing and search tool and the one or more mereological and functional relationship databases include a semantic analysis knowledge base.

6. The method according to claim 1, wherein the system models include device functional models and the component elements include one or more device component elements.

7. The method according to claim 1, wherein the system models include process functional models and the component elements include one or more process component elements.

8. The method according to claim 1, further comprising representing a system element as being graphically linked to one or more other system elements.

9. The method according to claim 1, wherein the one or more mereological and functional relationship databases include multiple knowledge bases.

10. A computer program product comprising computer-executable instructions stored in at least one non-transitory storage device and executable by at least one processor to perform a method for identifying elements of a system, the method comprising:

providing a system element store comprising machine-readable representations of system models comprising system elements;

electronically receiving a graphical user interface input identifying a system model as an electronic representation of the system, wherein the system elements represent a set of system objectives;

in response to the graphical user interface input,
extracting corresponding system elements from the identified system model from the system element store, and
automatically formulating a query by transforming the extracted system elements;

classifying the system elements of the system element store as a whole element of a whole-part relationship, an entity element of an entity-relation-entity relationship, a pair of entity elements of an entity-relation-entity relationship, or a relation element of an entity-relation-entity relationship, and updating the query using the classified system elements;

using the updated query to search one or more mereological and functional relationship databases with a knowledge search engine, the one or more merelogical and functional relationship databases including one or more general document repositories that are semantically indexed and contain non-hierarchical database structures and additional one or more knowledge bases selected from the group consisting of: one or more locally accessible knowledge bases, one or more knowledge bases containing corporate knowledge, and one or more publicly accessible knowledge bases;

retrieving, based on results from using the updated query to search the one or more merelogical and functional relationship databases with the knowledge search engine, component elements useful to form the extracted system elements and identify functional interactions between the component elements, wherein the component elements represent parts of entity-relationship-entity relationships represented in the identified system model; and storing and displaying the retrieved component elements and identified functional interactions as search results in association with the extracted system elements, wherein the search results are represented as user-selectable options indicating design alternatives to satisfy the set of system objectives of the system.

11. A system comprising at least one computer processor and at least one non-transitory computer storage device storing computer-executable instructions to implement a method for identifying elements of a system, the system comprising;

a system element store comprising machine-readable representations of system models comprising system elements classified as a whole element of a whole-part relationship, an entity element of an entity-relation-entity relationship, a pair of entity elements of an entity-relation-entity relationship, or a relation element of an entity-relation-entity relationship;

a query formulator configured to:
electronically receive a graphical user interface input identifying a system model as a selected electronic representation of the system;
extract corresponding system elements of the identified system model from the system element store in response to the graphical user interface input;
automatically formulate a query from the extracted system elements, wherein the extracted system elements represent a set of system objectives; and a knowledge search engine configured to use the query to:
search one or more merelogical and functional relationship databases containing one or more general document repositories that are semantically indexed and contain non-hierarchical database structures and additional one or more knowledge bases selected from the group consisting of: one or more locally accessible knowledge bases, one or more knowledge bases containing corporate knowledge, and one or more publicly accessible knowledge bases;
retrieve component elements useful to form the extracted system elements and identify functional interactions between the component elements, wherein the component elements represent parts of entity-relationship-entity relationships represented in the identified system model; and
output the retrieved component elements and identified functional interactions as search results in association with the extracted system elements, wherein the search results are represented as user-selectable options representing design alternatives to satisfy the set of system objectives of the system.

12. The system according to claim 11, wherein the query formulator is further configured to classify the system elements of the system store prior to formulating the query.

13. The system according to claim 11, wherein the query formulator is configured to format the query to be compatible with the knowledge search engine.

14. The system according to claim 13, wherein the query formulator is configured to format the query as either a natural language query, a Boolean query, a keyword query, or a query according to a syntax of a particular relational database management system.

15. The system according to claim 11, wherein the knowledge search engine comprises a semantic indexing and search tool and the one or more merelogical and functional relationship databases include one or more semantic analysis knowledge bases.

16. The system according to claim 11, further comprising one or more functional modeling tools.

17. The system according to claim 16, wherein the one or more functional modeling tools include a device functional modeling tool and the component elements include at least one device component element.

18. The system according to claim 16, wherein the one or more functional modeling tools include a process functional modeling tool and the component elements include at least one process component element.

19. The system according to claim 11, further comprising:
one or more computer processing elements;
one or more display devices;
one or more user input devices; and
communication elements for communicating with the one or more merelogical and functional relationship databases.

20. The system according to claim 19, wherein the system is configured to generate user-interactive screens on the one or more display devices, which are configured to represent a system element graphically linked to one or more other system elements.

* * * * *